United States Patent
Dennis

(10) Patent No.: US 7,577,829 B2
(45) Date of Patent: Aug. 18, 2009

(54) SYSTEM AND METHOD FOR MAINTAINING MULTIPLE INFORMATION HANDLING SYSTEM CONFIGURATION IMAGES

(75) Inventor: Lowell B. Dennis, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 469 days.

(21) Appl. No.: 11/413,935

(22) Filed: Apr. 28, 2006

(65) Prior Publication Data

US 2007/0255934 A1 Nov. 1, 2007

(51) Int. Cl.
*G06F 9/00* (2006.01)
*G06F 9/24* (2006.01)
*G06F 15/177* (2006.01)
*G06F 9/44* (2006.01)
*G06F 11/00* (2006.01)

(52) U.S. Cl. .............. 713/1; 713/2; 713/100; 717/170; 714/19; 714/20

(58) Field of Classification Search .......... 713/1, 713/2, 100
See application file for complete search history.

(56) References Cited

U.S. PATENT DOCUMENTS

| | | | | |
|---|---|---|---|---|
| 5,745,669 A | * | 4/1998 | Hugard et al. | 714/3 |
| 5,822,581 A | * | 10/1998 | Christeson | 713/1 |
| 6,167,532 A | * | 12/2000 | Wisecup | 714/23 |
| 6,253,319 B1 | * | 6/2001 | Tran et al. | 713/1 |
| 6,353,885 B1 | * | 3/2002 | Herzi et al. | 713/1 |
| 6,931,523 B1 | * | 8/2005 | Tomoson et al. | 713/100 |
| 7,318,173 B1 | * | 1/2008 | Falik et al. | 714/36 |
| 7,370,190 B2 | * | 5/2008 | Calhoon et al. | 713/2 |
| 7,418,590 B2 | * | 8/2008 | Azzarito et al. | 713/2 |
| 2001/0052067 A1 | | 12/2001 | Klein | 713/1 |
| 2004/0193953 A1 | * | 9/2004 | Callahan et al. | 714/15 |
| 2004/0260718 A1 | * | 12/2004 | Fedorov | 707/102 |
| 2005/0273588 A1 | * | 12/2005 | Ong et al. | 713/2 |
| 2006/0020844 A1 | | 1/2006 | Gibbons et al. | 714/2 |
| 2006/0143431 A1 | * | 6/2006 | Rothman et al. | 713/2 |

* cited by examiner

*Primary Examiner*—Thomas Lee
*Assistant Examiner*—Ji H Bae
(74) *Attorney, Agent, or Firm*—Hamilton & Terrile, LLP; Robert W. Holland

(57) ABSTRACT

Plural information handling system configuration setting restore points stored in non-volatile memory are selectable by an end user for use in booting an information handling system. For example, the configuration setting restore points include basic default settings having known safe values, factory default settings used at shipment of the system from its manufacturer and last known good settings last used in a successful boot. A configuration settings restore point interface presents the restore points to an end user for selective use in a system boot, such as if corruption is detected in the configuration settings of the CMOS of the information handling system.

2 Claims, 4 Drawing Sheets

SYSTEM AND METHOD FOR MAINTAINING MULTIPLE INFORMATION HANDLING SYSTEM CONFIGURATION IMAGES

BACKGROUND OF THE INVENTION

1. Field of the Invention

The present invention relates in general to the field of managing information handling system configuration information, and more particularly to a system and method for maintaining multiple information handling system configuration images.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have continued over time to grow in complexity with a greater number of components that operate in a wider variety of modes. In order to coordinate the operation of disparate components and modes, configuration information is typically saved on the information handling system in non-volatile memory for use when the system is booted. For instance, most configurable data is stored in battery backed CMOS memory and applied at boot so that the information handling system starts with components operating in a state desired by the end user. Typically, the memory storing configuration is check summed or otherwise checked for validity before application to the information handling system at boot. Although a check sum will typically detect spurious or incomplete changes to configuration information, it generally cannot ensure that the configuration information describes a viable configuration. Whether it happens intentionally or through a mishap, if the configuration information contents of CMOS are corrupt, the information handling system is generally rendered inoperative or unstable.

In the event that an information handling system boot fails or is unstable due to corrupt configuration information, "BIOS default" values stored in non-volatile memory are usually used in place of the corrupt configuration information. The BIOS default values are automatically applied by the BIOS if CMOS configuration information corruption is detected, or, alternatively, are manually applied by an end user, often with the help of a technical service representative through a telephone call center. Once the BIOS default values are applied, the information handling system will generally run as a stable but basic platform. Configuration settings previously entered at the system and stored in CMOS are generally lost. Thus, the end user typically faces a long, tedious and even painful process of re-entering configuration to return the system to a desired or optimal configuration.

SUMMARY OF THE INVENTION

Therefore a need has arisen for a system and method which provides greater flexibility for re-establishing corrupted CMOS configuration information from multiple restore points.

In accordance with the present invention, a system and method are provided which substantially reduce the disadvantages and problems associated with previous methods and systems for re-establishing corrupted CMOS configuration information. Plural configuration setting restore points are stored in non-volatile memory of an information handling system for selective use by an end user if configuration settings used to boot the information handling system become corrupt.

More specifically, an information handling system has plural processing components that coordinate to process information under the management of an operating system. Boot firmware initiates the operating system to run with configuration settings stored in non-volatile memory, such as CMOS. A restore point table stored in non-volatile memory, such as NVRAM, has plural restore points for selective use in the event that CMOS configuration settings become corrupt. For instance, a basic restore point has configuration settings with known safe values; a factory restore point has configuration settings used at shipment of the information handling system from its manufacturer; and, a last known good restore point has configuration settings last known to successfully support startup of the information handling system. A configuration setting restore point interface enables an end user to select a restore point configuration setting for use in boot of an information handling system in the place of current configuration settings. Replacement of current configuration settings with a default restore point is automatically initiated if corruption of current configuration settings is detected at boot by a configuration settings corruption engine. A configuration settings update module automatically updates the last known good restore point with the current configuration settings in the event of a successful system boot.

The present invention provides a number of important technical advantages. One example of an important technical advantage is that an information handling system end user has the flexibility to store multiple configurations for use in booting an information handling system. In the event of CMOS corruption, the end user is automatically presented with the multiple configurations and allowed to select a desired configuration to support system boot. A BIOS default configuration ensures the ability to have a stable if basic system up and running. A factory default allows the end user to return the system to the configuration established at shipment of the system from the factory. A last known good configuration allows the end user to select the most recent known good configuration to minimize updates that the end user will have to perform to return the system to a desired state. A user interface supports end user establishment of known configurations for selection in the event of CMOS corruption, such as enterprise IT settings, docked settings and undocked settings.

BRIEF DESCRIPTION OF THE DRAWINGS

The present invention may be better understood, and its numerous objects, features and advantages made apparent to those skilled in the art by referencing the accompanying

DETAILED DESCRIPTION

Storing plural configuration setting restore points in non-volatile memory of an information handling system allows end user selection of a desired restore point to boot the information handling system in the event of corruption of the system's CMOS configuration settings. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
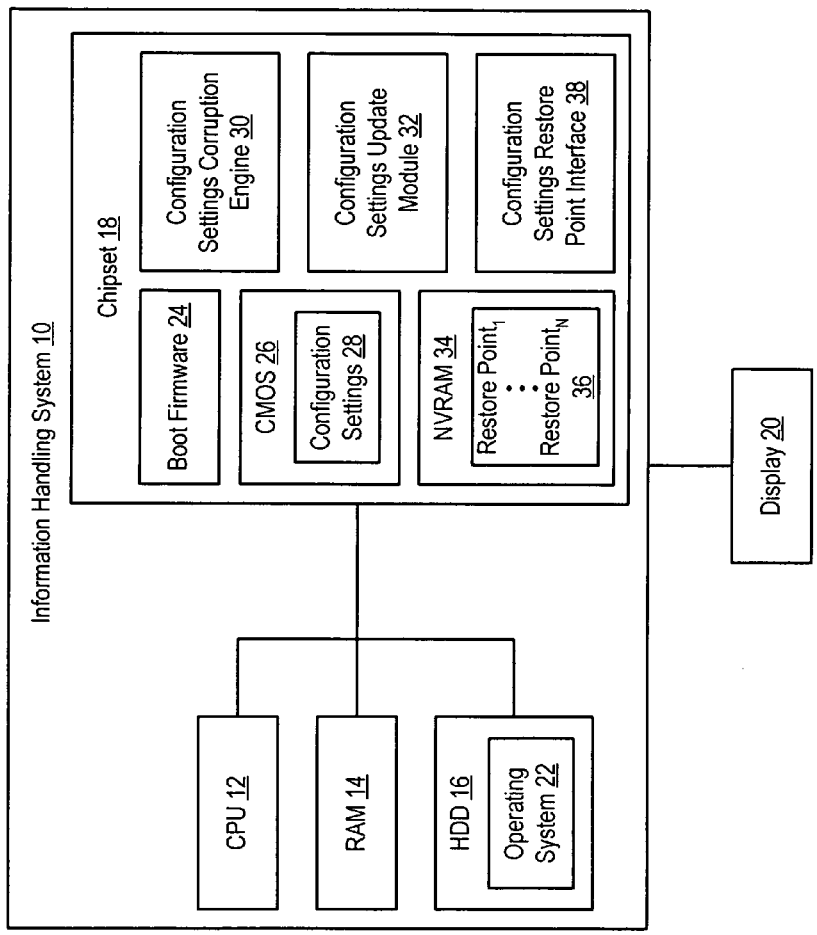
FIG. 1 depicts block diagram of an information handling system having plural configuration setting restore points.

Referring now to FIG. 1, a block diagram depicts an information handling system 10 having plural configuration setting restore points. Information handling system 10 is built from plural processing components that cooperate to process information, such as a CPU 12, RAM 14, a hard disk drive 16, and a chipset 18. Processed information is presented to an end user at an integrated or external display 20. Coordination of the processing components is managed by an operating system 22, such as WINDOWS or Linux. On startup of information handling system 10, boot firmware 24 on chipset 18 starts operating system 22 in a bootstrapping process that applies configuration settings 28 stored in CMOS 26. Operating system 22 applies configuration settings 28 to manage and coordinate proper operation of the processing components.

At boot of information handling system 10, a configurations settings corruption engine 30 checks configuration settings 28 in CMOS 26 to confirm the validity of the configuration settings, such as with a check sum. If no corruption is detected in configuration settings 28 and boot firmware 24 completes POST and initiates operating system 22, then a configuration settings update module 32 retrieves configuration settings 28 and stores configuration settings 28 as a "last known good" restore point in NVRAM 34 having a configuration settings restore point table 36. Restore point table 36 stores plural configuration settings restore points usable as configuration settings 28 to support boot of information handling system 10. A configuration settings restore point interface provides access to the plural restore points so that a selected restore point can be applied in the event of corruption of configuration settings 28. For instance, if configuration settings corruption engine 30 detects corruption of configuration settings 28, a selected restore point configuration settings is automatically applied to support boot of the system. During or after the boot, configuration settings restore point interface 38 provides an end user with options to instead select an alternative restore point. For example, a basic BIOS default restore point having known safe configuration setting values automatically populates CMOS 26 in the event of configuration settings corruption to support a boot. During boot, configuration settings restore point interface 38 presents alternative configuration setting restore points for selection by the end user. The restore points include a factory configuration setting having values set at shipment of the information handling system from the factory, an enterprise configuration setting having values used by an enterprise, a last known good configuration setting, a docked configuration setting or an undocked configuration setting.

Figure 2:
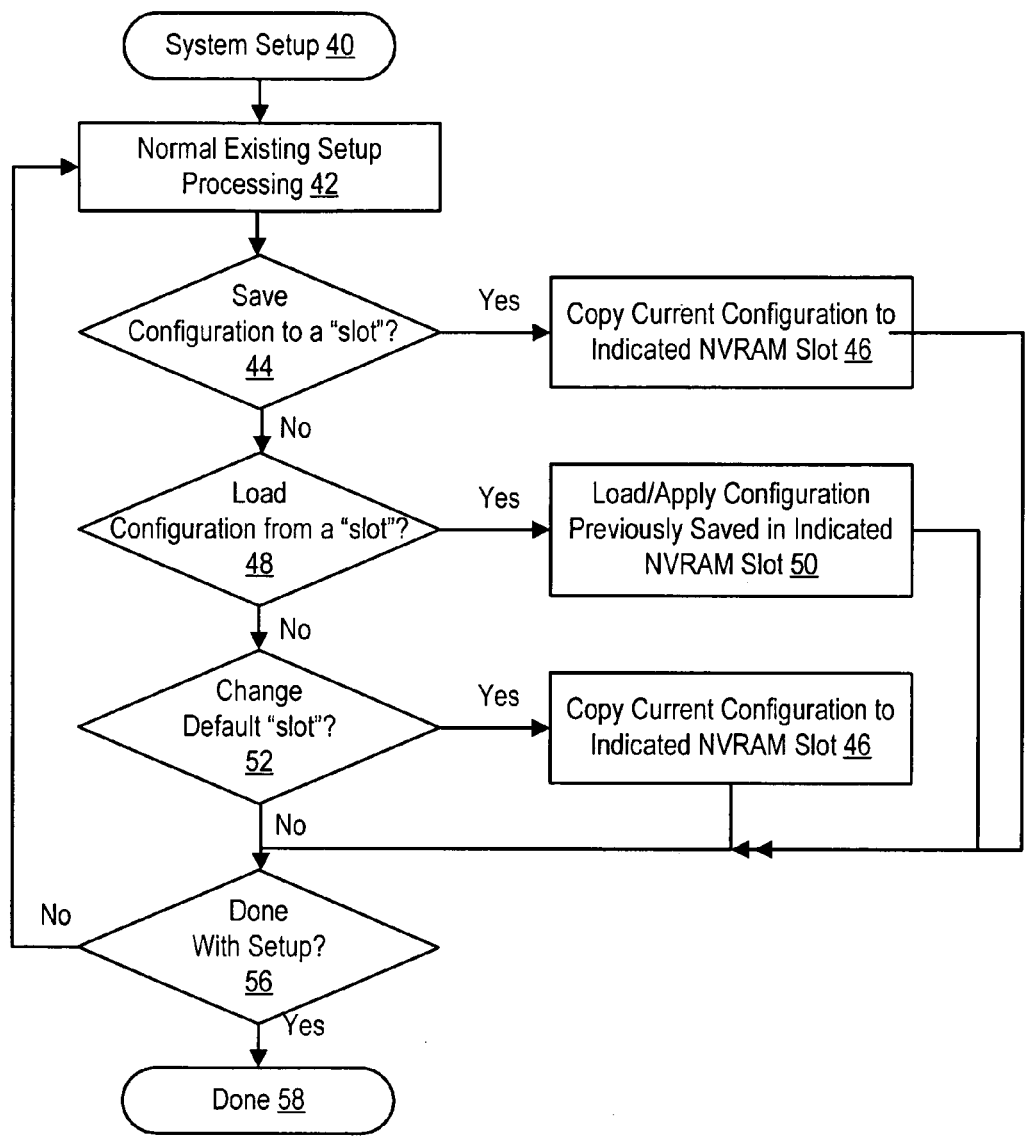
FIG. 2 depicts a flow diagram of a process for setting up an information handling system to have plural configuration setting restore points.

Referring now to FIG. 2, a flow diagram depicts a process for setting up an information handling system to have plural configuration setting restore points. The process begins at step 40 by entry into system setup mode. At step 42 normal or existing setup processing proceeds with the enforcement of password protection to prevent unauthorized access. At step 44, a determination is made of whether to save a configuration to a non-volatile memory slot. If yes, the process continues to step 46 to copy the current configuration to an indicated NVRAM slot and then proceeds to step 56. If the determination at step 44 is no, the process continues to step 48 to determine whether to load a configuration from non-volatile memory to use at boot of the information handling system. If a restore point is selected for use, the process continues to step 50 to load and apply the restore point configuration setting values from the indicated NVRAM slot to the information handling system CMOS and the process continues to step 56. If the determination at step 48 is no, the process continues to step 52 to determine whether to change a default slot so that a selected configuration setting will be used in the event of a CMOS configuration setting corruption. If yes, the process continues to step 54 to update the default NVRAM configuration slot indicator. At step 56, a determination is made of whether the setup of restore points is complete. If setup is not complete, the process returns to step 42. If setup is complete, the process ends at step 58.

Figure 3:
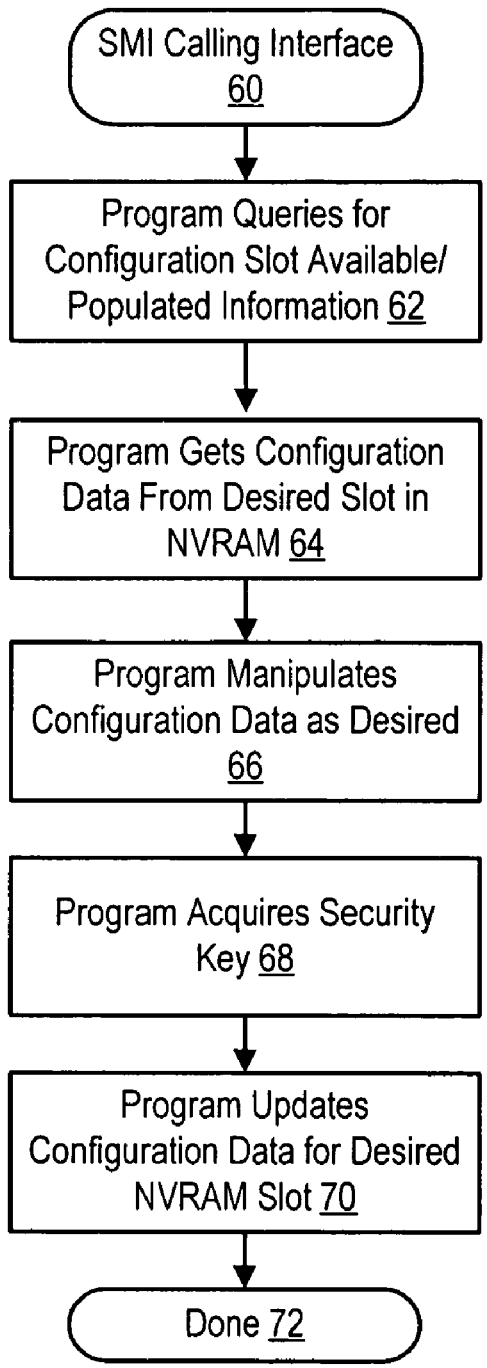
FIG. 3 depicts a flow diagram of a process for editing information handling system configuration setting restore points.

Referring now to FIG. 3, a flow diagram depicts a process for editing information handling system configuration setting restore points. During runtime, a calling interface, such as an SMI calling interface, initiates interaction with the restore points at step 60. At step 62, the SMI calling interface queries for configuration slot information, such as available slots and information stored in populated slots. At step 64, the configuration settings stored in the slots are retrieved from non-volatile memory and made available for interaction by an end user. At step 66, the SMI calling interface accepts end user inputs to manipulate configuration setting information as desired. Up to this point in the process, security key information is not needed, however, at step 68 security key information is acquired so that at step 70 application of the updated configuration settings information is permitted in the non-volatile memory and the process ends at step 72.

Figure 4:
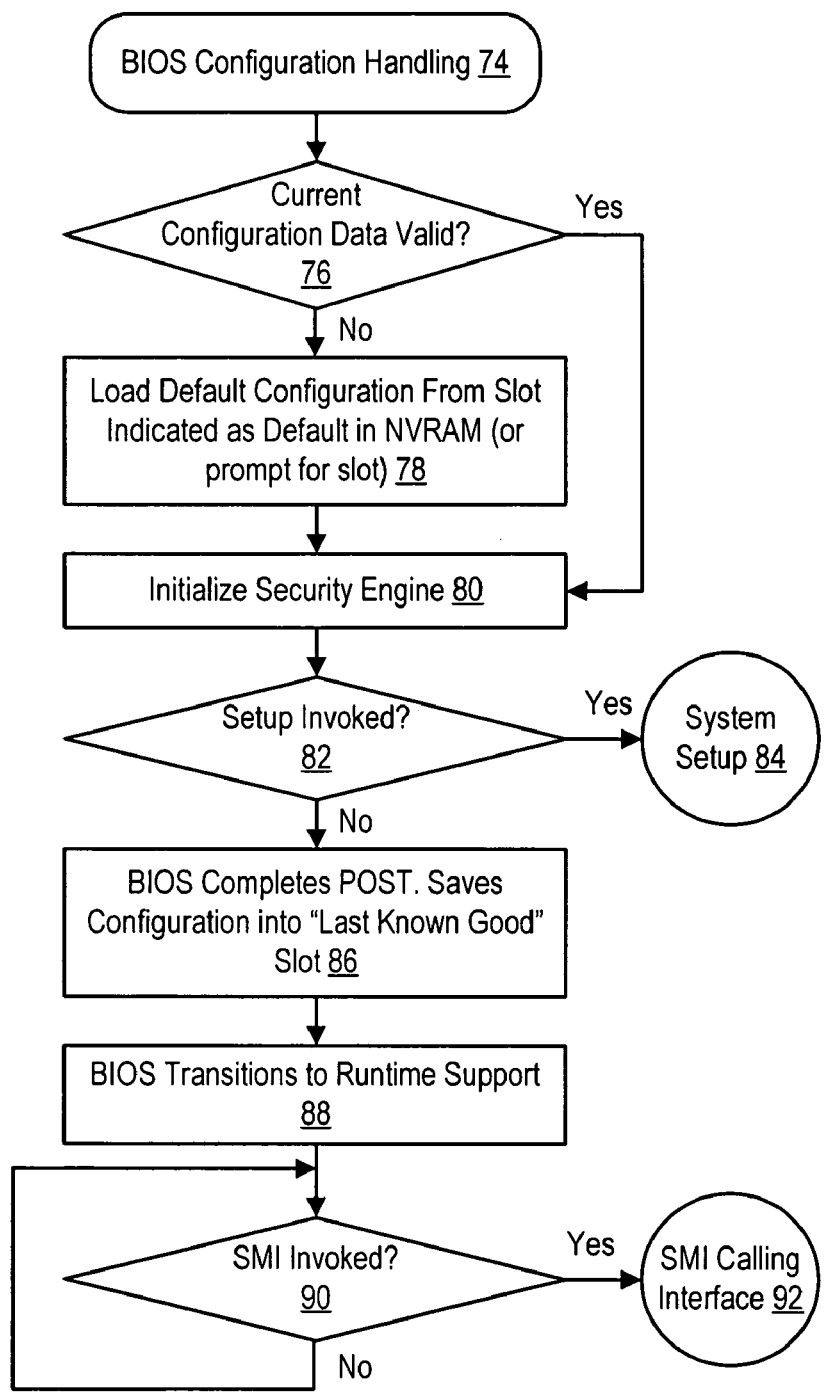
FIG. 4 depicts a flow diagram of a process for automatically applying a configuration setting restore point upon detection of corruption of an information handling system's configuration settings.

Referring now to FIG. 4, a flow diagram depicts a process for automatically applying a configuration setting restore point upon detection of corruption of an information handling system's configuration settings. The process begins at step 74 with BIOS configuration handling at power up of the information handling system. At step 76 a determination is made of whether the current configuration settings are valid. If not, the process continues to step 78 to load default configuration settings from the NVRAM slot indicated as having the default restore point or, alternatively, the end user is prompted to indicate the desired restore point configuration settings. In the event that only one valid configuration is stored, that configuration will automatically load as the default without a prompt to the end user. If at step 76 the configuration information is valid or, after loading defaults at step 78, the process continues to step 80 to initialize the security engine. At step 82, a determination is made of whether setup is invoked and, if so, the process enters system setup at step 84. If setup is not invoked at step 82, the process continues to step 86 to complete POST and, if successful, to save the current configuration settings as the last known good restore point. At step 88, with boot passed to the operating system, the BIOS transitions to support of runtime operations. Periodically, at step 90 a determination is made of whether the SMI interface is invoked and, if so, at step 92 the SMI calling interface runs to allow user interaction with the restore point configuration settings.

Although the present invention has been described in detail, it should be understood that various changes, substitutions and alterations can be made hereto without departing from the spirit and scope of the invention as defined by the appended claims.

What is claimed is:

1. A method for managing information handling system CMOS configuration settings, the method comprising:
   storing plural configuration setting restore points in nonvolatile memory of the information handling system;
   detecting corruption of CMOS configuration settings;
   presenting the plural configuration setting restore points at a display associated with the information handling system;
   receiving a selection of one of the plural configuration restore points; and
   applying the selected configuration restore point to operate the information handling system;
   wherein presenting the plural configuration setting restore points at a display associated with the information handling system further comprises:
   initiating boot of the information handling system with basic configuration settings;
   automatically entering CMOS setup; and
   presenting a CMOS setup interface having the plural configuration setting restore points.

2. The method of claim 1 wherein the plural configuration setting restore points comprise at least basic default, factory default and last known good configuration setting restore points.

* * * * *

UNITED STATES PATENT AND TRADEMARK OFFICE
CERTIFICATE OF CORRECTION

PATENT NO. : 7,577,829 B2 Page 1 of 1
APPLICATION NO. : 11/413935
DATED : August 18, 2009
INVENTOR(S) : Lowell B. Dennis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this

Seventh Day of September, 2010

David J. Kappos
*Director of the United States Patent and Trademark Office*